INVENTOR
JAMES WALTER GEARING
BY
Watson, Cole, Grindle & Watson
ATTORNEY

United States Patent Office 3,614,889
Patented Oct. 26, 1971

3,614,889
VIBRATION TESTING OF SPECIMENS
James Walter Gearing, St. Leonards-on-Sea, England, assignor to Derritron Electronics Limited, St. Leonards-on-Sea, Sussex, England
Filed Nov. 20, 1969, Ser. No. 873,734
Claims priority, application Great Britain, Nov. 21, 1968, 55,264/68
Int. Cl. G01n 29/00
U.S. Cl. 73—67     8 Claims

ABSTRACT OF THE DISCLOSURE

In a method of locating stresses in a specimen being vibrated by an electro-mechanical vibrator, the infra-red radiation from different points on the specimen surface, due to variations of temperature caused by stress, is detected by scanning the image of a detector over the surface. The variation may be indicated or recorded by using the detector output to control an electron beam which is similarly scanned over a screen.

---

This invention relates to vibration testing of specimens and is concerned with testing a specimen to obtain information as to the location of stresses produced in it by vibration.

According to the present invention such a method of testing includes subjecting the specimen to the vibration, and detectng radiation from different points of its surface due to rise of temperature caused by stresses produced by the vibration.

The vibration may be produced in any known or preferred manner, depending on requirements. While the invention primarily envisages the use of an electromechanical vibrator it may also find application when the vibration is produced otherwise, for example manually with the aid of a violin bow.

Moreover the radiation may be detected in various ways. Where it is practicable, the radiation may be detected and recorded by normal infra-red photography, employing a sensitive film and a lens of wide aperture.

In some cases, however, the temperature produced may be such that infra-red photography would involve an excessive exposure. For this or other reasons it may be preferred to detect the radiation by a radiation detector provided with an optical system which causes it to respond to radiation from a point (or small area) and which is moved relatively to the specimen to scan it, the sequence of responses thereby produced being recorded.

A read-out device may be caused to scan a screen in a pattern analogous to the scanning of the specimen so as to produce a map of the temperature distribution and hence stress distribution. In this case the arrangement may be analogous to a television receiver, in which an electron beam scans the screen and the intensity of the beam represents the instantaneous response of the detector. The record may then take the form of a photograph in which the tone represents the stress. Alternatively the record may comprise a number of separate line traces one corresponding to each line of the scan, the beam being deflected at right angles to the trace to an extent depending upon the response of the radiation detector. The record will then take the form of a series of parallel graphs representing the area of the specimen scanned, the ordinate o feach graph representing the stress at the corresponding point.

In a further alternative the response of the radiation responsive device is merely recorded in sequence, for example on magnetic tape.

Figure 1:
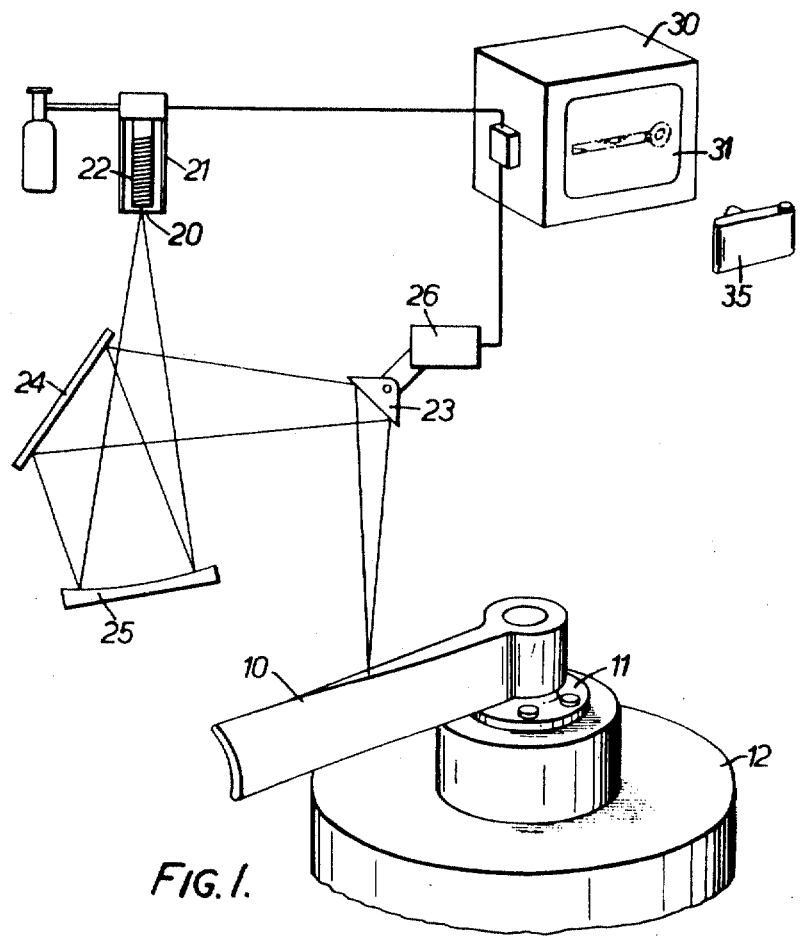
Figure 2:
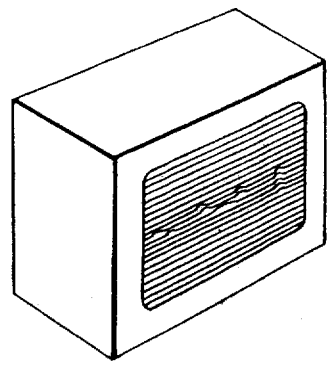

The invention may be put into practice in various ways but one specific embodiment will be described by way of example with reference to the accompanying diagrammatic drawings in which:

FIG. 1 is a schematic diagram of an apparatus for exploring the pattern of infra-red radiation of a specimen subjected to a vibration test, and FIG. 2 is a diagram similar to part of FIG. 1 showing an alternative form of read-out.

As shown in FIG. 1 a specimen 10 to be subjected to vibration testing is mounted on the table 11 of an electromagnetic vibrator 12 which may be of any preferred type, for example as described in the commonly owned British patent specification No. 43613/66 and No. 27658/68.

The stresses produced in the sample cause a certain small amount of heat to be evolved so that the pattern of temperature and emission of infra-red radiation from different parts of the sample will correspond more or less precisely to the stress pattern. To detect this radiation an infra-red detector 20 is provided. This may comprise a semi-conductor layer on the inner wall of a Dewar flask 21 containing a cryogenic cooler 22 producing liquid nitrogen to maintain the detector at a low temperature.

The radiation is directed by an optical scanning system comprising a scanning reflector 23, a fixed reflector 24 and a concave reflector 25. These are arranged to focus an image of the detector at a point on the specimen and conversely to focus radiation from the said point on the detector. The scanning reflector is provided with a motor unit 26 serving to oscillate it about two axes at right angles, about one at a frame frequency and about the other at a substantially higher line frequency, so as to scan the image of the detector over the specimen in a series of parallel lines in a manner generally analogous to a television camera.

A viewer 30 has a cathode ray tube incorporating a screen 31 and sweep circuits, analogous to the video portion of a television receiver, the sweep circuits being coupled to the motor unit so as to scan the electron beam across the screen in synchronism with the scanning of the image of the detector across the specimen.

The output of the detector, after suitable amplification, is applied to the cathode ray tube to control the intensity of the beam.

Thus a picture is formed on the screen which is analogous to a television picture but represents a map of the infra-red radiation intensity from different areas of the specimen.

The phosphors of the screen may be chosen in accordance with the scanning frequencies to retain a steady picture. This may be recorded by a camera 35.

In an alternative arrangement illustrated in FIG. 2 the intensity of the electron beam remains constant, and the output from the detector, after suitable amplification, is applied to the vertical deflecting circuit of the cathode ray tube so as to be superimposed on the frame frequency signal. The line and frame frequencies are chosen so as to form a series of distinct and separate lines extending horizontally across the screen, and the record will then take the form of a series of parallel graphs representing the area of the specimen scanned, the ordinate of each graph representing the stress at the corresponding point.

In a further alternative (not illustrated) the response of the detector is merely recorded in sequence, for example on magnetic tape.

What we claim as our invention and desire to secure by Letters Patent is:

1. A method of locating stresses in specimens subject to vibration testing, which includes subjecting the specimen to the vibration, and detecting radiation from different points of its surface due to rise of temperature caused by stresses produced by the vibration.

2. A method as claimed in claim 1 in which the specimen is vibrated by an electro-mechanical vibrator.

3. A method as claimed in claim 1 in which the radiation is detected and recorded by infra-red photography.

4. A method as claimed in claim 2 in which the radiation is detected by a radiation detector provided with an optical system which causes it to respond to radiation from a point (or small area) which moves relative to the specimen to scan it.

5. A method as claimed in claim 4 in which a read-out device is caused to scan a screen in a pattern analogous to the scanning of the specimen so as to produce a map of the temperature distribution and hence stress distribution.

6. A method as claimed in claim 5 in which, in a manner analogous to a television receiver, an electron beam scans the screen and the intensity of the beam represents the instantaneous response of the detector.

7. A method as claimed in claim 5 in which the readout comprises a number of separate line traces one corresponding to each line of the scan, the beam being deflected at right angles to the trace to an extent depending upon the response of the radiation detector.

8. Apparatus for locating stresses in specimens subject to vibration testing, including an electromechanical vibrator for subjecting the specimen to vibration, and a radiation detector provided with an optical system which causes it to respond to radiation from a point (or small area) which moves relative to the specimen to scan it.

References Cited

UNITED STATES PATENTS

| | | | |
|---|---|---|---|
| 1,680,589 | 8/1928 | Bock | 73—15.6 |
| 3,430,045 | 2/1969 | Björk et al. | 250—83.3 |

RICHARD C. QUEISSER, Primary Examiner

J. P. BEAUCHAMP, Assistant Examiner

U.S. Cl. X.R.

73—67.3, 88